Figure 1:
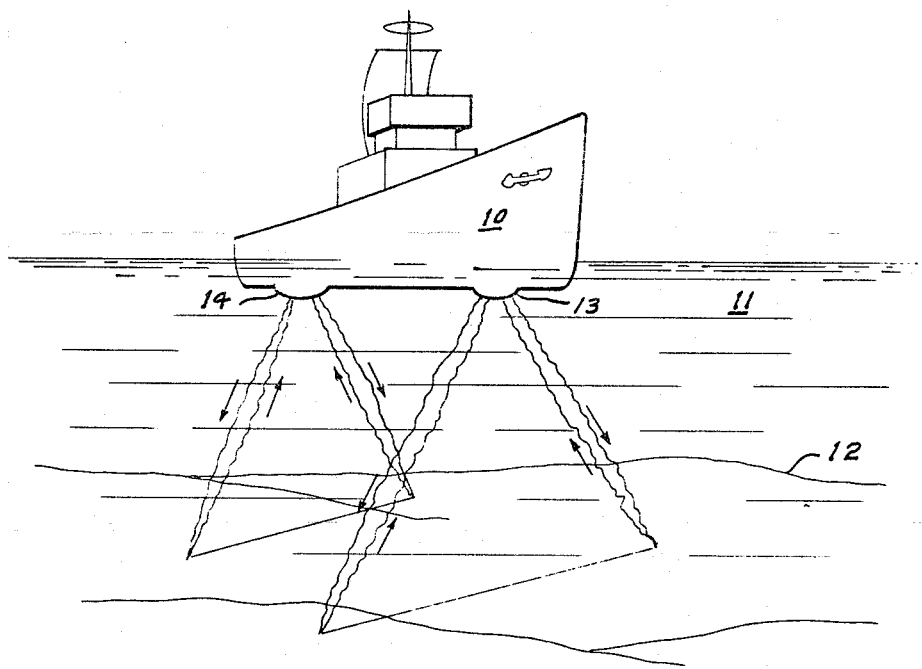

United States Patent Office 3,277,430
Patented Oct. 4, 1966

3,277,430
INDEPENDENT DIRECTION REFERENCE SYSTEM
Julius Hagemann, deceased, late of Bay County, Fla., by Marie Hagemann, executrix, Bay County, Fla., and David H. Brunk, Panama City, Fla., assignors to the United States of America as represented by the Secretary of the Navy
Filed July 31, 1964, Ser. No. 386,802
3 Claims. (Cl. 340—3)

The invention described herein may be manufactured and used by or for the Government of the United States of America for governmental purposes without the payment of any royalties thereon or therefor.

The present invention relates to ship borne air or nautical navigation equipment and more particularly to a directionally stabilized device which maintains a constant reference direction with respect to the earth's surface.

An object of the present invention is to provide apparatus by which a member may be maintained in a fixed position with respect to some reference axis, for example, to maintain a compass card or a navigation device constantly oriented toward the same direction with respect to the earrth's surface.

Directionally stabilized devices in common use with navigation systems are in the nature of a compass, i.e., they indicate the direction of north, most modern systems utilizing a gyrocompass for this purpose. North seeking gyrocompasses are not only quite expensive, but have the disadvantage that their accuracy deteriorates when underway. The present invention utilizes a Doppler system for maintaining within a limited area, say a 50-mile square, a constant reference direction which can be any desired direction including north. In this Doppler system, two or more beams of radiant energy from the vehicle to be navigated are transmitted at an angle to the earth's surface and portions of the energy received and processed after reflection from the surface of the earth. More specifically, radiant wave energy is transmitted from and received at two stations spaced as far as practicable along the longitudinal axis of the vehicle, the beams of radiant energy being directed parallel to each other at right angles to such axis and at a suitable declination. As the vehicle moves over the surface of the earth, any component of motion at right angles to the longitudinal axis causes the frequency of the received energy to deviate from that of the transmitted energy and by measuring and subtracting the frequency shifts at the two stations the resulting difference is proportional to the velocity and direction of rotation of the vehicle about a vertical axis, zero difference indicating no rotation about the vertical axis. The net velocity can readily be converted into angular motion of the vehicle about a vertical axis by using the known distance between the transducers. As indicated above, the system functions as a compass within relatively limited areas and for such use it will be referred to as a Doppler compass.

From the foregoing it will be apparent that if a ship were to travel over the earth in a given direction as indicated by a Doppler system of the present invention, there would be no rotation of the ship about its local vertical axis with respect to the earth. The resulting path followed would be a great circle over the earth. While the direction as indicated by this Doppler system would be constant, the true geographical direction would be continously changing except when the path of travel was over the Equator or along a meridian. For travel in a relatively small area, say a 50-mile square, in latitudes below 80 degrees, a constant Doppler compass direction would be essentially equal to a constant geographical direction since the actual error woud be negligible.

Figure 2:
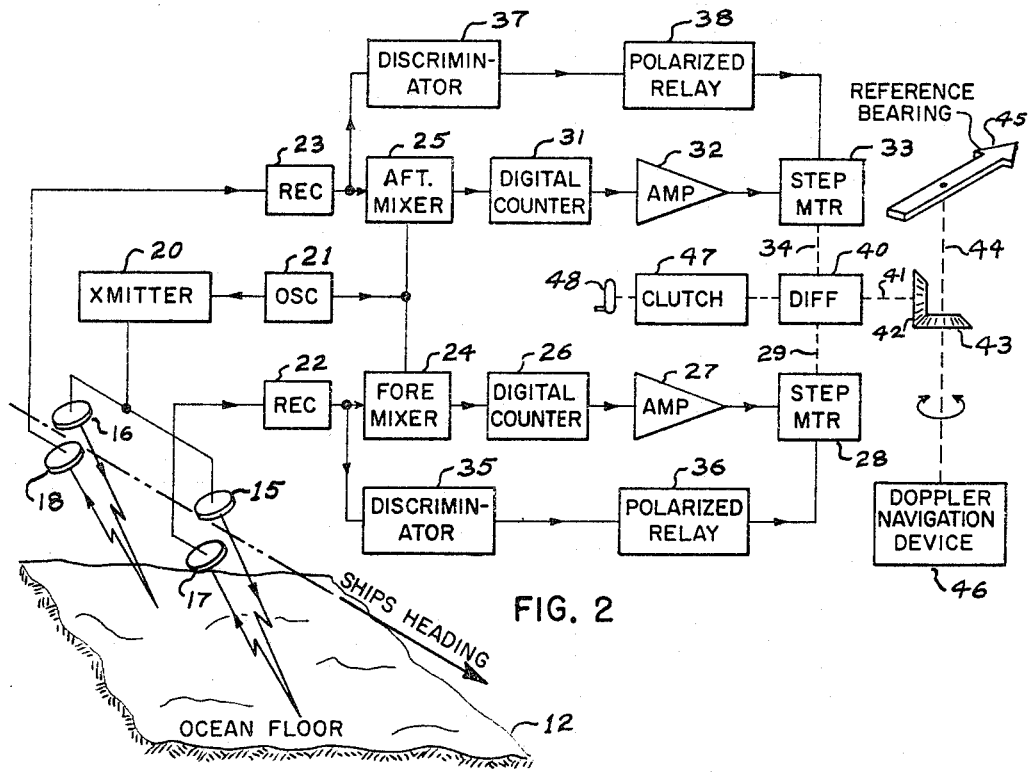

FIG. 1 is a representation of a ship provided fore and aft with two pairs of keel mounted sound projectors and receivers directed at right angles to the longitudinal axis of the ship; and FIG. 2 is a schematic diagram of a system for detecting and indicating craft rotation about a vertical axis relative to any initially selected reference direction.

In accordance with the embodiment of the invention to be described in detail sonar Doppler effects are employed to sense rotation of a ship about a vertical axis, which Doppler effects are employed to maintain the desired directional orientation of a navigation device or to drive a compass dial, or both.

Referring now to FIG. 1, there is shown a ship 10 under way in a body of water 11 having a waterbed 12. Spaced along the keel of the ship 10 are two sonar domes 13 and 14, fore and aft, respectively, each of which may contain one or, as here indicated, two pairs of sound projectors and receivers of known type oppositely directly downwardly at say 45 degrees and at right angles to the keel of the ship 10. Each such pair transmits acoustic wave energy which after deflection from the bottom 12 is received, the frequency of the received energy being compared with the frequency of the transmitted energy to detect any Doppler effect in any well known manner. Any component of motion of the ship 10 at right angles to the ship's longitudinal axis will be detected and by known techniques, either analog or digital, can readily be converted into information relative to rotation of the ship 10 about a vertical axis through the ship. Such rotational information when transformed into rotary shaft positions may be utilized to maintain a device stabilized with respect to a constant reference direction with respect to the earth's surface 12. For convenience, applicants' invention will be described in detail utilizing a single Doppler detecting unit on each of the domes 13 and 14.

In the embodiment of the invention shown in FIG. 2 two transmitting transducers 15 and 16 and their associated receiving transducers 17 and 18, respectively, are mounted in spaced relation along a line parallel to the ship's heading indicated by an arrow and fixed in position for transmitting and receiving wave energy at right angles to the ship's axis, i.e., heading. The two transducers 15 and 16 are driven by a transmitter 20 whose frequency is controlled by an oscillator 21 while the reflected signals received by the transducers 17 and 18 are fed to separate receivers 22 and 23 the outputs of which are individually beat with the signal from the oscillator 21 in mixers 24 and 25, respectively, to provide beat note signals corresponding, respectively, to Doppler effects experienced by the fore and aft receiving transducers 17 and 18.

The beat note signal output of the mixer 24 is applied to a digital scaler 26 which is preferably a binary counter which produces a pulse output at a selected submultiple rate of the beat input. The output pulses from counter 26 are applied through a power amplifier 27 to a step motor 28 of the type which provides an absolute rotation of its shaft 29 proportional to the count provided at its input. In the same manner, the output of the mixer 25 is processed through a digital counter 31, a power amplifier 32, and a step motor 33 for controlling the rotational position of the shaft 34 of the motor 33. The direction of rotation of the step motors 28 and 33 are controlled in accordance with whether the frequency of the Doppler shifted energy from its corresponding receiver is higher or lower than the carrier frequency provided by the oscillator 21. As here shown, the output of the receiver 22 is applied to a discriminator 35 whose center frequency is tuned to the frequency of the oscillator 21 for establishing whether the frequency of the output of the receiver 22 is higher or lower than such frequency. The output of the discriminator 35 is fed to a polarized relay 36 which controls the direction of rotation of the step motor 28 in accordance with the sense of the output of the discriminator 35. In the same manner, the output of the receiver 23 is processed through a discriminator 37 and a polarized relay 38 to control the direction of rotation of the step motor 33. The outputs of the shafts 29 and 34 are subtracted by a differential 40 so that if there is no rotation of the ship about a vertical axis through the ship, i.e., no change in the ship's direction or heading, the exactly equal outputs of the shafts 29 and 34 would cancel, giving no output from the differential 40. The differential 40 has an output shaft 41 which through gears 42 and 43 drive a shaft 44 to which may be attached a reference bearing pointer 45 as well as a navigation device 46 to maintain the desired directional orientation of the pointer 45 and the navigation device 46. Instead of the pointer 45 the shaft 44 may be provided with a compass card which preferably is settable to indicate geographic direction and for this purpose the differential may be manually adjusted through a clutch 47 by means of a hand crank 48. In this way, the pointer 45 or a compass card may be set to match the compass rose or to coincide with some other fix such as parallel to the dock from which departure is made.

Instead of utilizing a digital technique such as above described the system of the invention may make use of suitable analog techniques for converting Doppler effects into shaft positions. One such analog technique is disclosed by Julius Hagemann, one of the present inventors, in application Serial No. 451,316, filed August 20, 1954, now Patent No. 3,153,220.

It will be evident from the foregoing that the system of the invention provides a directionally stabilized device which furnishes heading information and which can replace, at least in limited areas of operation, the gyrocompass for maintaining a navigation device constantly oriented in a desired geographical direction. If operation is contemplated in heavy seas the transducer pairs 15 and 17 and 16 and 18 may be vertically stabilized in any well known manner.

While for the purpose of disclosing the invention for enabling those skilled in the art to practice it a specific embodiment has been described in detail, it is to be understood that the invention is not limited thereto but is of the scope of the appended claims.

What is claimed is:
1. An independent direction reference system including
at least two pairs of wave energy transmitting and receiving means mounted in spaced relation along a longitudinal axis,
each of said pairs being oriented to transmit and receive wave energy along a direction perpendicular to said axis,
means for providing in the form of a shaft position the Doppler frequency shift sensed by each of said receiving means, and
means for converting said shaft positions into an indication of rotational movement of said longitudinal axis about a vertical axis through said longitudinal axis.

2. A Doppler system for determining the magnitude of any change in heading of a mobile craft relative to ground including,
continuous wave Doppler means for deriving separate electric signals corresponding to the speeds in the direction at right angles to the craft's heading of first and second longitudinally spaced locations on said craft, and
means operative in response to said electric signals for providing a physical manifestation representative of changes in heading of said craft.

3. A navigation aid for determining rotational movement of a ship about a vertical axis comprising
ship carried means for transmitting wave energy towards the ground,
two transducer means for separately receiving wave energy reflected from areas of the ground spaced a known distance apart along a line parallel to the ship's heading,
means for deriving Doppler frequency signals from each of said receiver means,
means responsive to said Doppler frequency signals to produce a control signal having a characteristic representing the sense and magnitude of the departure of the ratio between said Doppler signals from unity, and
means responsive to said control signal.

References Cited by the Examiner
UNITED STATES PATENTS 3,065,463  11/1962  Turner _____ 343—9
3,095,562   6/1963  Dworetzky et al. _____ 343—8

CHESTER L. JUSTUS, *Primary Examiner.*

R. A. FARLEY, *Assistant Examiner.*